United States Patent [19]

Wrightson

[11] 4,187,215

[45] Feb. 5, 1980

[54] POLYMERIC ISOCYANATE-HYDROXY TERMINATED POLYBUTADIENE COMPOSITIONS

[75] Inventor: John M. Wrightson, Carmichael, Calif.

[73] Assignee: Aerojet-General Corporation, El Monte, Calif.

[21] Appl. No.: 292,195

[22] Filed: Sep. 25, 1972

[51] Int. Cl.$^2$ .............................................. C08F 18/24
[52] U.S. Cl. ..................................... 528/51; 102/103; 528/52; 528/53; 528/57
[58] Field of Search ............... 260/77.5 AB, 77.5 AC, 260/77.5 AT; 102/102, 103

[56] References Cited
U.S. PATENT DOCUMENTS

| | | | |
|---|---|---|---|
| 3,433,158 | 3/1969 | Pierce | 102/103 |
| 3,507,114 | 4/1970 | Webb | 102/103 X |
| 3,636,881 | 1/1972 | Godfrey | 102/103 |

Primary Examiner—Stephen J. Lechert, Jr.
Attorney, Agent, or Firm—Edward O. Ansell; William M. Dooley

[57] ABSTRACT

A composition and method are disclosed in which a homopolymeric isocyanate such as a toluene diisocyanate polymer is formed IN SITU within a polyurethane composition containing a hydroxy-terminated organic compound, preferably a polybutadiene, an amount of self-polymerizable polyisocyanate in excess of the stoichiometric requirement, and a polymerization catalyst therefor. The composition can be fully cured on a surface and yet provides an excess of stable material, i.e. dormant isocyanate containing groups which are reactive on demand to strengthen interfaces with adjacent layers containing available hydroxyl groups, such as a layer of solid polyurethane-based propellant, without the need for intermediate reactive coatings.

12 Claims, 2 Drawing Figures

POLYMERIC ISOCYANATE-HYDROXY TERMINATED POLYBUTADIENE COMPOSITIONS

BACKGROUND OF THE INVENTION

1. Field of the Invention:

The present invention relates to polyurethane compositions and more particularly to a fully cured rocket motor chamber or casing liner for use in the manufacture of a solid propellant motor.

2. Description of the Prior Art:

Liner layers are required in solid propellent motors for several reasons. They are utilized to render a motor casing gas impermeable, to provide a heat insulating film between the casing and the propellant, and also as a material interposed between the chamber wall and the propellant to which the propellant can adhere. Solid propellants based on a polyurethane binder especially those made from hydroxy terminated polybutadiene (HTPB) as one of the carbamate linkage forming compounds have been found to exhibit very poor adherence to liners. This has seriously affected motor system reliability.

Even though the initial bond of the propellant to the liner may appear to be satisfactory, after aging the bond can weaken and reliability of the bond becomes questionable. The most probably cause for change in bond characteristics on aging is the migration of plasticizers and other reactive components from the propellant to the liner during cure of the propellant. This upsets the propellant-binder cure causing the bonding polymer phase to become weaker than the propellant matrix.

HTPB propellants which usually contain as much as 35% plasticizer are generally bonded to liner-formulations which are unplasticized. When plasticizer migrates from the propellant to the liner, several effects can occur. The migration of pure plasticizer from the propellant to the liner layer is not normally considered to be detrimental to adhesion as long as the plasticizer is soluble in both the propellant and substrate liner. However, the migration of impure plasticizer can cause problems.

The propellant may contain a variety of materials such as an antioxidants, non-functional prepolymer, and soluble burning rate additives. These materials would ordinarily have very little tendency to migrate from the propellant. The presence of plasticizer in the propellant binder, however, results in a less tight polymer structure such that it is possible for some of said materials to migrate with the plasticizer. The migration of unreacted diisocyanate from the propellant binder into the plasticizer is the most serious cause of poor propellant-liner bond formation. This upsets the binder polymer layer stoichiometry at the interface resulting in a weak boundary layer. Occasionally this phenomena is so severe that the interface material becomes so soft and sticky that the resulting bond strengths are very low.

Various measures have been attempted in order to improve the interfacial bonding. In one approach, a washcoat solution containing a curing agent such as toluene diisocyanate (TDI) in chlorothene was sprayed onto the surface of the cured liner stratum before application of the propellant. However, the liner did not consistently exhibit good bonding to the propellant again causing poor reliability. Poor processability and short storage life were also experienced. Formulation of the liner or propellant with excess curing agent, such as TDI, was attempted but was found to be unsatisfactory due to an adverse affect on the physical properties of the liner or propellant. Partially cured liners were also considered but were not found to be satisfactory due to limited time available to cast the propellant onto the partially cured liner and again adhesion of the propellant to the liner and the liner to the chamber was not always to the desired degree due to the criticality of the time required, often only a few hours, before which casting of the propellant must take place.

Ser. No. 292,196 filed Sept. 25, 1972 by this inventor discloses a recently devised system in which preformed isocyanate dimer of molecular weight less than about 750 is added to a liner composition preferably in combination with monomeric polyisocyanate. This system provided excess stable isocyanate and improved bond and interface characteristics. However, the dimer must be separately preformed and is a crystalline, particulate solid insoluble in the liquid composition and, as such, must be thoroughly dispersed before cure.

OBJECTS AND SUMMARY OF THE INVENTION

It is therefore an object of the invention to provide a substrate primer layer for a polyurethane propellant that is fully cured at the time of casting of the polyurethane propellant layer and which does not require the use of a washcoat which contains reactive moieties.

A further object of the invention is to provide a composition having a useful bonding life of at least 30 days at +85° F. and at 30% Relative Humidity and that is suitable for application using existing spray equipment.

A still further object of the invention is to provide high heat insulation compositions for lining a rocket motor casing which can be directly bonded to propellant to provide superior bonds without the need of a washcoat.

Yet another object of the invention is to provide reliable liner-propellant bonding with the use of a fully cured liner.

Another object of this invention is to provide a heat-insulating liner which provides a reliable adhesive bond having an adhesive strength at least equal to the cohesive strength of the propellant.

An additional object of this invention is to provide an improved liner composition which does not require the addition of a preformed, reactive solid isocyanate additive.

These and other objects and attendant advantages of the invention will become apparent as the description proceeds.

Superior bonds are provided in accordance with this invention by formulating the polyurethane forming composition with an excess of polymerizable di- or polyisocyanate and a catalyst for promoting the polymerization reaction between NCO groups to form an isocyanate based polymer IN SITU within the composition. The isocyanate based polymer is a thermally stable solid which does not migrate from the liner. After complete cure of the liner composition, said polymer is capable of reacting on demand with compounds containing active hydrogen such as compounds including hydroxyl groups which are contained within a layer of polyurethane propellant composition subsequently applied thereon, which reaction strengthens the linerpropellant interfacial polymer bond without the necessity of using either washcoating techniques or adding a prereacted material to the liner such as the dimer material of the referenced application.

The liner is fully cured and therefore its physical properties may be optimized before casting of the propellant such that the time interval before casting the propellant can be completely variable. The interfacial bond is completely reliable and the method of the invention simplifies rocket motor production techniques with a liner system that provides superior bond strengths.

The invention will now become better understood by reference to the following detailed description when considered in conjunction with the accompanying drawings.

DESCRIPTION OF THE PREFERRED EMBODIMENTS

Figure 1:
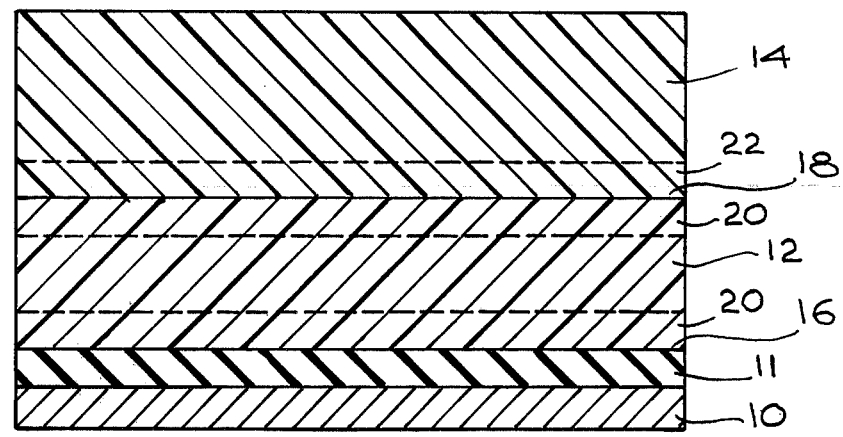
FIG. 1 is a cross-sectional view of a conventional solid propellant rocket motor.

Referring now to FIG. 1, the figure depicts the various strata that exist in the formation of a solid propellant-containing motor chamber. The motor casing or chamber 10 is typically formed of a reinforced structure, such as a woven glass or metal assembly. A heat insulation layer 11 such as an elastomer filled with asbestos or carbon may be applied to the casing 10. A liner 12 typically having a thickness of 1/64 to ¼ inch is next interposed to provide a bonding substrate to adhere the propellant 14 to the wall of the chamber 10. If liner 12 contains heat insulating fillers, the heat insulation layer 11 may not be necessary. The liner 12 forms a liner-chamber interface 16 with the chamber 10 or a liner-insulator interface 16 if a heat insulating liner is present, and a propellant-liner interface 18 with the propellant. The surface of the cured liner is polymer rich and forms a polymer rich layer 20 at each of the interfaces 16, 18.

This is also true of the propellant which forms a binder rich layer 22 at the interface 18. The binder rich layer 22 and the polymer rich layer 20 are lower in strength than the solids reinforced binder and propellant. During cure of the propellant, the reactive curing species of the binder can migrate into the liner. This considerably weakens the strength of the propellant binder rich bonding layer 22. This phenomenon causes a weak binder layer to form which results in inferior liner-propellant bonds.

The polymerization reaction for hydroxyl-terminated polybutadiene (HTPB) propellants is generally represented as:

control of the isocyanate level because the prepolymer has a functionally greater than 2. The Li-HTPB has a functionality less than 2, and therefore, requires a tri-functional cross-linking species which is usually a tri-functional hydroxy containing compound, such as the propylene oxide adduct of hexane triol. Utilizing the above reactions, about 5000 units of HTPB react with 84 units of isocyanate. The migration of isocyanate from the propellant binder interface into the liner has a substantial affect on the cure stoichiometry with a consequent reduction in the strength of the bonding polymer layer.

As discussed above, the prior techniques utilized to counteract the isocyanate migration problem were (1) the addition of supplemental isocyanate at the interface by means of washcoats containing isocyanate placed on the surface of cured liners or (2) the use of partially cured liners. In the present invention excess isocyanate species is provided at the interface by utilizing thermally stable isocyanate precursors in excess of the amount of isocyanate normally used for stoichiometric cure of the liner. The isocyanate group precursor is uniformly distributed throughout the liner, is thermally stable and contains dormant isocyanate containing groups capable of reacting on demand with hydroxyl containing species such as HTPB within the adjacent propellant layer to form urethane groups which provide a strong, reliable interfacial bond.

Figure 2:
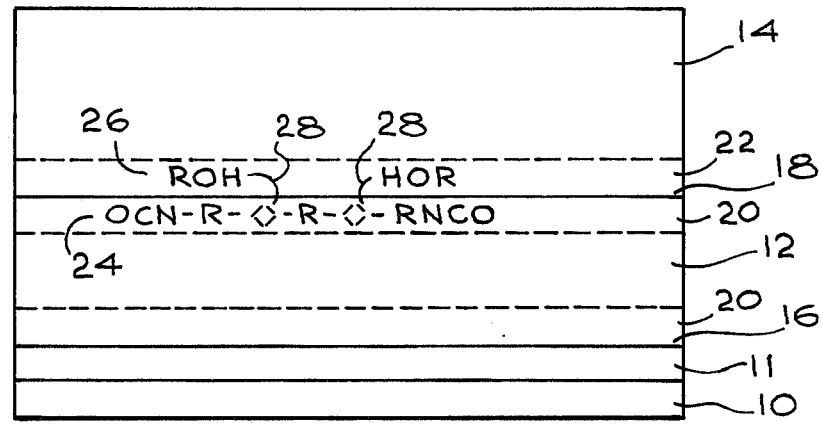
FIG. 2 is a cross-sectional view of a rocket motor in accordance with the invention.

Referring now to FIG. 2, the liner polymer rich layer 20 in accordance with the invention contains very stable isocyanate, polymeric precursor species 24 in the binder rich layer 22 which when contacted by the propellant layer 18 are converted or rearranged into functionally reactive compounds. After application of the propellant layer 18 the precursor species 24 react with hydroxyl substituted species 26 within the binder rich layer 22 to form cross-linking bonds 28 which firmly adhere the liner layer 12 to the propellant layer 14.

The composition of the invention generally comprises any polyurethane composition capable of wetting the surface of an adjacent layer such as a propellant layer containing a high loading of solids and containing available hydroxyl groups reactive with the isocyanate precursor in the liner. The liner composition is generally comprised of about 30% to 65% by weight of inert, solids and from 1–10% of various additives such as cure promoters, stabilizers and thixotropic control agents, the remainder being polyurethane forming components.

Preferred liner compositions contain little or no volatile solvent or plasticizer. The composition essentially contains in part by weight 20–65 parts of a liquid hydroxy terminated prepolymer, 15–35 parts of inert solid fillers, 4–10 parts of stabilizers and rheological control

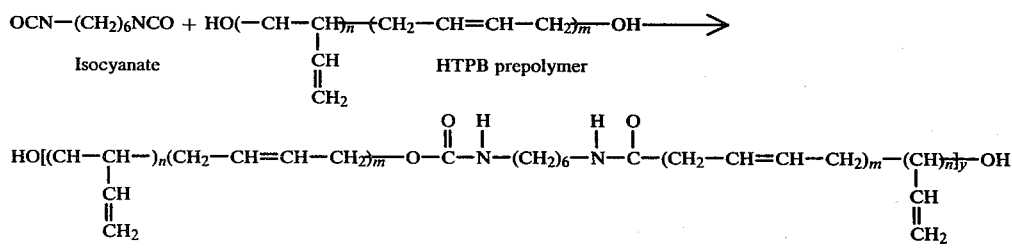

where n, m and y are integers greater than 1.

The HTPB can be of the free radical-initiated type (FR-HTPB) or of the lithium-initiated type (Li-HTPB). With FR-HTPB cross linking is achieved through the additives, 3–20 parts of reactive polymeric modifiers, such as one or more diols or polyols, an equivalent amount of isocyanate sufficient to react with the prepolymer and hydroxyl substituted modifiers, an excess amount of one or more polymerizable di- or polyisocyanates, which may be the same or different from the isocyanate previously added, in an amount from 25 to 100% equivalent excess above stoichiometry and a catalyst in an amount effective to polymerize said polymerizable polyisocyanate. Optionally all of the isocyanate including said excess amount may be added at one time since only the stoichiometric amount will react with the hydroxyl groups, even if the catalyst for NCO group homopolymerization is present, since the carbamate linkage formation is the preferred reaction.

The equivalent weight of the liquid prepolymer is at least 1,000 and not usually more than 5,000. The functionality of the prepolymer is advantageously from about 1.7 to about 3.0, preferably from about 1.9 to 2.3 to form by cross-linking and chain extending final elastomeric polymers of molecular weight of at least 20,000. Since higher molecular prepolymers may require heat to reduce viscosity, the molecular weight is preferably from 1,000 to 3,000.

The liquid hydroxyl terminated prepolymers for the liner composition are preferably of the type that form elastomeric polymers, suitably hydroxyl terminated polymeric dienes or polyether glycols such as polyethylene glycol, polypropylene glycol and higher alkylene oxide adducts of aliphatic glycols and triols.

The liquid prepolymers are preferably of the diene elastomer type, for example, homopolymers or copolymers of a conjugated diene containing from 4–12 carbon atoms, such as 1,3-butadiene, isoprene, 2,3-dimethyl-1,3-butadiene, 1,3-pentadiene (piperylene), 3-methyl-1,3-pentadiene and the like. In the case of a diene copolymer, the comonomer should not exceed 35% of the polymer in order to preserve elastomeric properties. Suitable comonomers are vinyl substituted aromatic and aliphatic compounds, such as acrylonitrile, butene, styrene and the like.

The polyisocyanate for curing prepolymer can be selected from those of the general formual R(NCO)$_m$ in which R is a di- or polyvalent organic radical containing from 2–30 carbon atoms and m is 2, 3 or 4. R can be alkylene, arylene, aralkylene or cycloalkylene. It is preferred that the organic radical be essentially hydrocarbon in character although the presence of unreactive groups containing elements other than carbon and hydrogen is permissible as is the presence of reactive groups which are not capable of reacting with functional groups capable of forming urea or carbamate linkages such as to interfere with the desired reaction.

Examples of suitable compounds of this type include benzene-1,3-diisocyanate, hexane 1,6-diisocyanate, toluene 2,4-diisocyanate (TDI), toluene 2,3-diisocyanate, diphenylmethane 4,4'-diisocyanate, naphthalene 1,5-diisocyanate, diphenyl 3,3'-dimethyl 4,4'-diisocyanate, diphenyl 3,3'-dimethoxy 4,4'-diisocyanate diethyl ether, 3-(diethylamino)-pentane 1,5-diisocyanate, butane-1,4-diisocyanate, cyclohex-4-ene-1,2-diisocyanate, benzene-1,3,4-triisocyanate, naphthalene-1,3,5,7-tetraisocyanate, metaphenylene diisocyanate (MDI), naphthalene-1,3,7-triisocyanate, toluidine-diisocyanate, isocyanate terminated prepolymers, polyaryl polyisocyanates, and the like.

Polyols are preferably, but not limited to, diols or triols and can be either saturated or unsaturated aliphatic, aromatic or certain polyester or polyether products. Exemplary compounds include glycerol, ethylene glycol, propylene glycol, neopentylglycol, pentaerythritol, trimethylolethane, glycerol triricinoleate, or alkylene oxide adducts of aniline such as Isonol which is N,N-bis-(2-hydroxypropyl) aniline and many other polyols well known in the art which can be incorporated into the liner composition to control the degree of cross-linking. The particular compound and amount utilized is dependent on the functionality and nature of the hydroxyl terminated prepolymer and polyisocyanate employed in the link composition.

Since the functionality of Li-HTPB is generally slightly less than 2, the polyol is preferably a triol so as to provide cross-linking between polymeric chains upon reaction with isocyanates. As exemplary polyols, mention may be made of glycerol triricinoleate (GTRO) and Isonol (a propylene oxide adduct of aniline), N,N-bis-(2-hydroxypropyl)-aniline. The polyisocyanate is present in an amount necessary to satisfy stoichiometry, that is, the functionality of the HTPB and any other polyol present in the composition. The polyisocyanate may be a di-, tri- or higher functional material and may be aliphatic in nature such as hexanediisocyanate but is preferably an aromatic polyisocyanate such as TDI. A catalytic cure promoting agent can be utilized. These agents may be metal salts such as metal acetylacetonates, preferably thorium acetylacetonate (ThAA) since iron acetylacetonate and other iron salts may act as an oxidation catalyst for the HTPB.

The homopolymeric polyisocyanate is believed to be formed according to the following general reaction scheme when a diisocyanate is used:

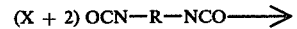

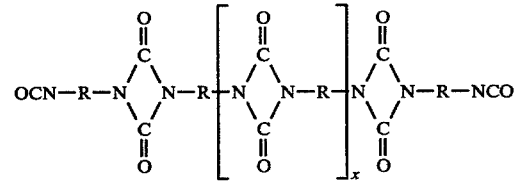

where x is a positive integar of at least 1 and R is a divalent organic group such as aliphatic or aromatic, suitably lower alkylene or phenylene. The isocyanate based polymer formed may contain isocyanurate rings depending upon the choice of catalyst and reactant. Exemplary polymerizable diisocyanates are 2,4- and 2,6-toluene diisocyanate (TDI), hexamethylene diisocyanate (HDI) and metaphenylene diisocyanate. The polymer is formed in the presence of an effective amount of a catalyst such as a tertiary amine such as triethylamine or pyridine, trialkyl phosphine such as tributyl phosphine, alkali metal methoxide such as sodium methoxide, oxalic acid and a large number of soluble metal compounds such as potassium acetate, calcium acetate, sodium formate and the like. The minimum amount of catalyst can be as low as 0.01 weight percent of the composition up to about 2% by weight. Excess catalyst may tend to cause dissociation of the polymer.

The polymer which contains uretidine dione rings and perhaps isocyanurate rings dissociates or reacts directly with active hydrogen compounds. The reaction is believed to be a reversible equilibrium reaction with conversion at equilibrium increasing with decreasing temperature and with removal of polymer from the reaction mixture. Conversely, the dissociation of the uretidine dione ring is favored by higher temperature and removal of monomeric isocyanate. A preferred polyisocyanate which is satisfactory for satisfying the stoichiometric requirements of the hydroxyl groups of the liner composition and which forms polymeric isocyanate is TDI which is a readily available commercial material.

The homopolymer of TDI readily forms by adding several drops of triethylamine to TDI. The homopolymer forms at room temperature and has a clear, amber, glass-like, non-crystalline appearance, of molecular weight, believed to be greater than about 500.

Since the homopolymer is formed "in situ" and therefore competes with HTPB for isocyanate in the normal cure reaction, the amounts of excess TDI is critical. It was found that in the presence of triethylamine a 25 equivalent % excess of TDI did not provide sufficient TDI to give a complete liner cure. A 50% equivalent excess gave good liner cures and excellent bonds. A 100% equivalent excess did not show any advantage over the 50% excess which is the preferred amount.

Solid fillers can be selected from antimony oxide, carbon black, fibrous silica or the like. These provide both structural strength and heat insulation qualities to the product. Heat insulating binders generally include both $Sb_2O_3$ and silica fibers. Liners having lower heat insulation characteristics may include only carbon black filler. Stabilizers may be selected from aromatic amines such as di-$\beta$-naphthyl-p-phenylenediamine, thioesters such as ditridecylthiodiproprionate, sulfur and chromic chloride. A suitable rheological control additive is Thixcin E which is a thixotropic agent (Baker Castor Oil Co.).

General and specific liner compositions are presented in the following Table:

TABLE I
(Examples 1 and 2)

| Component Type | Name | Wt % Range | Ex. 1 High Heat Insulating Wt % | Ex. 2 Low Heat Insulating Wt % |
|---|---|---|---|---|
| Antimony oxide | $Sb_2O_3$ | 0–15 | 10 | 0 |
| Carbon Black | | 5–15 | 10 | 5 |
| Silica Fiber | | 0–10 | 6 | 0 |
| HTPB | | 30–50 | 48.22 | 42 |
| Cross-linking Agent | Glycerol Triricinoleate | 5–15 | 7.19 | 16 |
| TDI | | 0–30 | | 24 |
| Isonol | | 2–6 | 4.13 | 8 |
| Cure-Catalyst | ThAA | 0.1–0.3 | 0.20 | 0.20 |
| HTPB Stabilizers | Aromatic Amine | | | |
| Stabilizer | Sulfur Thioether | 0.5–9.0 | 5.90 | 7.98 |
| Thickener | Thixcin E | 0–2 | 0.98 | 0.98 |

The liner is prepared by forming a premix of all components except the isocyanate and the catalyst. The premix may be heated if required to dissolve the components, typically to a temperature between 100° F. to 160° F. The isocyanate and catalyst are then added optionally incrementally, and blended into the premix. The liner composition is then applied by spraying, brushing or casting onto the EPR rubber insulation layer and permitted to fully cure in place. Typical liner thicknesses range between 1/64 to ¼ inch in thickness and are easy to apply even at the minimum thicknesses.

During cure of the liner composition there are competing reactions between the isocyanate groups reacting with themselves to form the polymeric isocyanate and reacting the hydroxyl groups of the polybutadiene and the diol and/or triol to form carbamate linkage. However, since the isocyanate is present in an excess amount over stoichiometry, i.e., need for the NCO-old preferential reaction, even though some of the NCO groups of the unreacted isocyanate or dione rings may react with the hydroxyl groups, there is an excess of both available for reaction with the OH groups of the propellant.

The propellant is cast onto the surface of the fully cured liner. The propellant formulation is typically prepared at a temperature of from 70° F. to 150° F. The propellant composition usually contains a high proportion of combustible solids typically in excess of 65% by weight, a small proportion of binder usually below 15% by weight and a small amount below about 3% by weight of burning rate accelerator. The combustible solids usually comprise an oxidizer such as ammonium perchlorate and a finely divided metal such as aluminum powder.

EXAMPLE 3

A Li-HTPB based propellant was prepared containing 88% solids by mixing together in parts by weight 73 parts of ammonium perchlorate, 15 parts aluminum powder, 1 part of a burning rate accelerator and 11 parts of a Li-HTPB binder system including a stoichiometric amount of TDI similar to that of Example 1.

EXAMPLE 4

A FR-HTPB propellant was prepared containing 86% solids by mixing together in parts by weight, 70 parts of ammonium perchlorate, 16 parts of aluminum powder, 1¼ parts of burning rate accelerator and 12 parts of a FR-HTPB system including a stoichiometric amount of TDI.

EXAMPLE 5

A liner formulation was prepared utilizing the heat insulating premix of Example 1 by adding TDI and catalyst to the premix in the following proportions:

| Component | Weight % | |
|---|---|---|
| Premix | 46.25 | |
| TDI | 5.50 | (100% Eq. excess) |
| Triethylamine | .08 | |

The premix was degassed before and after addition of the TDI and catalyst. The triethylamine promoted formation of TDI polymer as evidenced by the appearance of an amber colored, glassy material throughout the liner. The composition was cured for 16 hours at 135° F.

EXAMPLES 6 AND 7

Similar materials were utilized and the process was repeated, except that the isocyanate used was MDI in Example 6 and HDI (hexamethylene diisocyanate) in Example 7. The compositions were cured after about 16 hours at 135° F.

EXAMPLE 8

A liner formulation was prepared according to the procedure of Example 5 containing the following ingredients:

| Component | Weight % | |
|---|---|---|
| Premix | 90.80 | |
| TDI | 9.08 | (50% Eq. excess) |
| Triethylamine | .12 | |
| | 100.00 | |

The adhesion of the liners of Examples 5 and 8 to the propellants of Examples 3 and 4 was tested by casting the propellants at 135° F. onto the precured liners and conducting an initial bond strength test and an aged bond strength test after exposing the assembly to a temperature of 160° F. for two weaks at 30% relative humidity (R.H.). The data is presented below:

TABLE 2

| Liner | Propellant | Bond Tensile Strength Initial | | | Bond Tensile Strength Aged | | |
|---|---|---|---|---|---|---|---|
| | | psi | Break | Surface | psi | Break | Surface |
| Ex. 5 | Ex. 3 | 120 | CPI | Dry | 138 | CPI | Dry |
| Ex. 8 | Ex. 4 | 116 | 70 CPI 30 CP | Dry | 119 | CPI | Dry |
| Ex. 5 | Ex. 3 | 135 | CPI | Dry | 131 | CPI | Dry |
| Ex. 8 | Ex. 4 | 115 | CPI | Dry | 113 | CPI | Dry |

The data indicates that excellent bonds can be obtained with the liner formulations containing homopolymerized TDI. Similar, comparable results would be obtained with the use of the other homopolymerized polyisocyanates in place of the TDI homopolymer. The following definitions are utilized in the description of failure locations in joint strength testing:

TABLE 3

| Designation | Description of Separation | Appearance |
|---|---|---|
| CP | Cohesive in Propellant | Break occurred in the body of the propellant, greater than 1/16" from interface. |
| CPI | Cohesive in Propellant at Interface | Only a thin film of propellant appears on the liner. |
| APL | Adhesive Propellant/Liner | The break showed no apparent trace of either the propellant or the liner on the opposite surface |
| ALI | Adhesive Liner/Insulator | Liner adhered to propellant, but pulled away from the Insulator. |
| AIM | Adhesive Insulator/Metal | Insulator adhered to liner, but pulled away from the metal base. |

If more than one designation is involved in the failure, this is indicated by stating approximate percentages for each.

Examination of failed surfaces of CPI and APL type visually indicates that a thin layer of propellant materials is almost always on the liner. This indicates that the failure is caused by a weak boundary layer of material at or very near the interface. It was noted that the layer was thinner with propellants containing ultrafine oxidizer than with propellants having a coarser oxidizer grind. This suggests that the actual interface is composed of a thin film of propellant binder material on the propellant side and a likewise thin polymer layer on the liner side. The tensile strength and modulus of the propellant binder is considerably lower, by about a factor of 0.1, than those of the propellant. The tensile properties of the liner polymer can be strengthed by controlling the crosslink density. This is not possible with propellants because the tensile properties are controlled by propellant performance requirements. Therefore it is not surprising that the failure is usually on the propellant side of the interface and is most frequently of the CPI type.

The adhesion of the liner of Example 8 to propellants was compared to a prior art liner TDI cured composition without any homopolymeric TDI in the liner. Additional prior art samples containing a TDI washcoat (WC) were tested. The application of the washcoat requires a separate application step. The washcoat contained 9.85% TDI, 0.15% ferric acetylacetonate and 90.0% chlorothene. The liners were tested by casting the propellant directly after cure and also after standing 48 hours at ambient room temperature and R.H. which are 77° F. and approximately 30% R.H. The aging tests were carried out after storage for two weeks at 160° F. The data are all directly compatible because all of the bond specimens were prepared from the same batch of propellant of each type. Bond tensile strength above 90-95 psi is considered very satisfactory.

TABLE 4

| Liner | Propellant | Bond Tensile Strength, psi | |
|---|---|---|---|
| | | Initial | Aged |
| Ex. 8 | 3 | 136 | 136 |
| Ex.8 | 4 | 140 | 133 |
| Prior Art | 3 | 103 | 101 |
| Prior Art | 4 | 127 | 116 |
| Prior Art-WC | 3 | 124 | 119 |
| Prior Art-WC | 4 | 134 | 128 |

While all the above-described liner-propellant combinations provide satisfactory bond strengths, the most desirable performance is obtained with liner formulations according to this invention.

When a TDI in chlorothene washcoat is utilized, the bonding life is only a few hours regardless of the humidity to which the liner is exposed. The non-criticality of the time of casting the propellant is illustrated by the following tests. The liner of Example 8 was tested for extending bonding life as shown in the following table.

TABLE 5

| Propellant | % R.H. | Days at R.H. | DPT, psi | Break |
|---|---|---|---|---|
| Ex. 3 | 0 | 10 | 134 | CPI |
| " | 0 | 6 | 137 | " |
| " | 0 | 3 | 134 | " |
| " | 20 | 10 | 132 | CPI/CP |
| " | 20 | 6 | 131 | " |

TABLE 5-continued

| Propellant | % R.H. | Days at R.H. | DPT, psi | Break |
|---|---|---|---|---|
| " | 20 | 3 | 133 | CPI |
| " | 30 | 10 | 134 | CPI/CP |
| " | 30 | 6 | 129 | CPI |
| " | 30 | 3 | 134 | " |
| " | 50 | 10 | 136 | CPI/CP |
| " | 50 | 6 | 134 | CPI |
| " | 50 | 3 | 130 | CPI/CP |
| Ex. 4 | 0 | 6 | 151 | " |
| " | 0 | 3 | 134 | " |
| " | 20 | 6 | 146 | CPI |
| " | 20 | 3 | 132 | " |
| " | 30 | 6 | 138 | " |
| " | 30 | 3 | 128 | " |
| " | 50 | 6 | 137 | " |
| " | 50 | 3 | 128 | " |

For the two propellants (Ex. 3 and Ex. 4), the bonding life (the time the cured liner can stand before propellant is cast) is at least 10 days at humidities as high as 50% R.H.

The extended bonding life is of significant advantage in the production of rocket motors since the liner schedule need not be related to the propellant casting schedule but may be stored for substantial periods before the propellant is cast.

It is to be seen that liner layers formed from the instant compositions which contain the isocyanate based polymer precursor are easier to apply to the chamber directly or onto the interposed insulation layer than other liner compositions, since at the time of addition, as by spraying or brushing, the solids content of the composition due to the polymer which is to bond to the propellant is substantially zero. This is because the polymer is formed in situ subsequent to the placement of the liner layer onto the chamber.

It is to be realized that only preferred embodiments of the invention have been described and that numerous substitutions, alterations and modifications are all permissible without departing from the spirit and scope of the invention as defined in the following claims.

What is claimed is:

1. A composition comprising in combination:
   organic compounds containing a plurality of hydroxyl groups capable of reacting with an isocyanato group;
   polyisocyanate of the general formula $R(NCO)_m$ in which R is a di-or polyvalent organic radical containing from 2–30 carbon atoms and m is 2,3, or 4;
   homopolymerizable polyisocyanate in excess of the stoichiometric amount necessary to form said polyurethane; and
   a catalyst in an amount effective for said homopolymerization.

2. A composition according to claim 1 in which the homopolymerizable polyisocyanate is present in an amount of 25 to 100% equivalent excess over said stoichiometric amount.

3. A method according to claim 2 in which the homopolymeric polyisocyanate has a molecular weight of at least 500 and is selected from compounds of the formula:

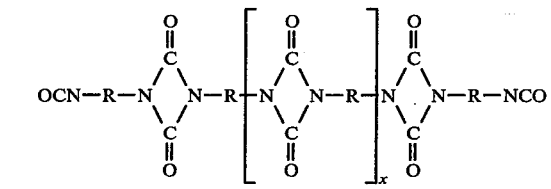

where R is a divalent organic group selected from aromatic or aliphatic and x is an integer of at least 1.

4. A composition according to claim 3 in which R is selected from lower alkylene or phenylene.

5. A composition according to claim 4 in which the homopolymerizable polyisocyanate is selected from toluene diisocyanate, hexamethylene diisocyanate and metaphenylene diisocyanate.

6. A composition according to claim 2 in which the catalyst is present in an amount between 0.01 to 2% by weight of the composition.

7. A composition according to claim 6 in which the catalyst is selected from tertiary amines, trialkyl phosphates, alkali metal alkoxides, oxalic acid and soluble metal salts of organic acids.

8. A composition according to claim 7 in which the catalyst is a tertiary amine.

9. A composition according to claim 8 in which the catalyst is triethylamine.

10. A composition according to claim 2 in which the composition comprises in parts by weight:
    20 to 65 parts of inert solid fillers;
    4–10 parts of stabilizers and rheological control additives; and
    3–20 parts of reactive prepolymer modifiers.

11. A composition according to claim 10 in which the reactive polymeric modifier comprises a triol.

12. A method of forming a polyurethane comprising the steps of:
    forming a polymerizable composition comprising:
    organic compounds containing a plurality of hydroxyl groups capable of reacting with an isocyanato group;
    polyisocyanate of the general formula $R(NCO)_m$ in which R is a di-or polyvalent organic radical containing from 2–30 carbon atoms and M is 2,3, or 4;
    homopolymerizable polyisocyanate in an amount in excess of the amount necessary to form said polyurethane; and
    a catalyst in an amount effective for said homopolymerization; and
    curing said composition to form said polyurethane containing a dispersion therein of said homopolymer.

* * * * *